US007526362B2

(12) United States Patent
Kim et al.

(10) Patent No.: US 7,526,362 B2
(45) Date of Patent: Apr. 28, 2009

(54) REMOTE ROBOT CONTROL METHOD USING THREE-DIMENSIONAL POINTING PROCEDURE AND ROBOT CONTROL SYSTEM USING THE REMOTE ROBOT CONTROL METHOD

(75) Inventors: Dong-yoon Kim, Seoul (KR); Jong-koo Oh, Yongin-si (KR); Won-chul Bang, Seongnam-si (KR); Joon-kee Cho, Yongin-si (KR); Kyoung-ho Kang, Yongin-si (KR); Sung-jung Cho, Suwon-si (KR); Eun-sook Choi, Anyang-si (KR); Wook Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 885 days.

(21) Appl. No.: 10/973,911

(22) Filed: Oct. 27, 2004

(65) Prior Publication Data

US 2005/0200325 A1 Sep. 15, 2005

(30) Foreign Application Priority Data

Mar. 12, 2004 (KR) .................. 10-2004-0016796

(51) Int. Cl.
*G06F 19/00* (2006.01)
(52) U.S. Cl. .................. 700/245; 700/231; 701/28; 706/45; 606/130; 318/568.12; 318/567; 318/675
(58) Field of Classification Search .............. 700/245, 700/231; 318/568.12, 567, 675; 701/28; 706/45
See application file for complete search history.

(56) References Cited

U.S. PATENT DOCUMENTS

| 5,429,140 | A | * | 7/1995 | Burdea et al. ............... 600/587 |
| 5,436,542 | A | * | 7/1995 | Petelin et al. ............... 318/567 |
| 5,442,729 | A | * | 8/1995 | Kramer et al. .............. 704/271 |
| 5,684,531 | A | * | 11/1997 | Li et al. ...................... 348/139 |
| 5,813,406 | A | * | 9/1998 | Kramer et al. .............. 600/595 |
| 5,841,258 | A | * | 11/1998 | Takenaka ............... 318/568.12 |
| 5,974,348 | A | * | 10/1999 | Rocks ......................... 701/28 |
| 6,016,385 | A | * | 1/2000 | Yee et al. ..................... 700/245 |
| 6,160,324 | A | * | 12/2000 | Terada et al. ................. 307/116 |

(Continued)

FOREIGN PATENT DOCUMENTS

KR       2001-39352 A       5/2001

*Primary Examiner*—Thomas G Black
*Assistant Examiner*—Wae Louie
(74) *Attorney, Agent, or Firm*—Sughrue Mion, PLLC

(57) ABSTRACT

A remote robot control method using a three-dimensional pointing procedure and a robot control system using the remote robot control method. The robot control system controls a robot in response to a user's gesture or sign without modifying the structure of the robot. The remote robot control method includes measuring a distance between a remote controller and a robot, calculating an initial position of the remote controller in an inertial navigation frame of the remote controller, calculating an initial position of the robot in the navigation frame of the remote controller, calculating an origin of the inertial navigation frame of the remote controller shown in an inertial navigation frame of the robot, calculating a new position of the remote controller in the inertial navigation frame of the remote controller, and calculating a new position of the robot in the navigation frame of the robot.

28 Claims, 11 Drawing Sheets

U.S. PATENT DOCUMENTS

| | | | |
|---|---|---|---|
| 6,232,735 B1 * | 5/2001 | Baba et al. | 318/567 |
| 7,117,190 B2 * | 10/2006 | Sabe et al. | 706/45 |
| 7,164,969 B2 * | 1/2007 | Wang et al. | 700/245 |
| 7,164,970 B2 * | 1/2007 | Wang et al. | 700/245 |
| 2004/0019406 A1 * | 1/2004 | Wang et al. | 700/231 |
| 2004/0189675 A1 * | 9/2004 | Pretlove et al. | 345/633 |
| 2004/0199290 A1 * | 10/2004 | Stoddard et al. | 700/248 |
| 2004/0243147 A1 * | 12/2004 | Lipow | 606/130 |
| 2005/0200325 A1 * | 9/2005 | Kim et al. | 318/568.12 |
| 2006/0167564 A1 * | 7/2006 | Flaherty et al. | 623/57 |
| 2007/0080658 A1 * | 4/2007 | Farritor et al. | 318/568.12 |

* cited by examiner

REMOTE ROBOT CONTROL METHOD USING THREE-DIMENSIONAL POINTING PROCEDURE AND ROBOT CONTROL SYSTEM USING THE REMOTE ROBOT CONTROL METHOD

BACKGROUND OF THE INVENTION

This application is based upon and claims the benefit of priority from Korean Patent Application No. 2004-16796, filed on Mar. 12, 2004, in the Korean Intellectual Property Office, the disclosure of which is incorporated herein in its entirety by reference.

1. Field of the Invention

The invention relates to a method of remotely controlling a mobile robot, and more particularly, to a remote robot control method using a three-dimensional pointing procedure by which a user can intuitively set a path or a destination point of a robot, and a robot control system using the remote robot control method.

2. Description of the Related Art

Robots are largely classified into stationary robots and mobile robots. Generally, industrial robots are stationary and carry out a particular job cycle repeatedly. They are used for factory/machinery automation, resulting in improved work efficiency, higher product quality, and reduced manpower. Industrial robots do things that human beings cannot perform, or things that are not appropriate for human beings to perform such as work in an environment dangerous to human beings.

One the other hand, mobile robots are much more versatile than the stationary industrial robots. Mobile robots may be remotely controlled by a controller and include, for example, cleaning robots and entertaining robots. Such cleaning robots operate by sucking dust or dirt from the floor of a set cleaning zone while moving around in the cleaning zone. When an obstacle appears, the cleaning robot stops temporarily, resets the cleaning zone automatically, and resumes cleaning.

FIG. 1 illustrates an operation of a cleaning robot 100. Referring to FIG. 1, the cleaning robot 100, which includes an infrared sensor, receives a command to clean a zone in a room. The cleaning robot 100 recognizes the zone by communicating with infrared receivers/transmitters 110 and 120. The cleaning robot 100 cleans the zone while recognizing a virtual barrier formed between the infrared receivers/transmitters 110 and 120.

Similarly, a voice or a sound such as a clap is used to command an entertainment robot to move to a position or in a direction desired by a user. Such a command, however, restricts the entertainment robot from moving out of or in a particular zone. Further, a more complicated command can be transmitted to the entertainment robot using a joystick or a mouse. However, in this case, a user has to keep track of the movement of the entertainment robot.

In contrast to the commands discussed above, human beings use simple gestures or sounds to command or convey complicated messages. But, since robots receive commands by recognizing images or voices, they cannot display the same type of natural interactions that occur among human beings.

In this regard, it is required to develop a system capable of recognizing a gesture, that is, a motion of a limb or body frequently used as a communication method among human beings. When the system is embedded in robots, natural interactions between human beings and robots can become a reality, thereby significantly widening the scope of robot applications.

Ongoing studies on robots capable of recognizing human gestures as well as voices are based on advanced recognition technologies. However, an image recognition technology required for recognizing human gestures entails the installation of expensive hardware equipment in a robot. Furthermore, the recognition performance of the robot is limited by its distance from a user and an intensity of illumination. Hence, the image recognition technology is not appropriate for robots used in homes.

Therefore, it is required to develop a system that does not greatly alter the existing structure of a robot and can easily recognize commands expressed by human gestures. When a user commands a robot, including such a system, to move to a zone or along a path, a simple and precise method of controlling the robot is needed.

SUMMARY OF THE INVENTION

The invention provides a remote robot control method using a three-dimensional pointing procedure.

The invention also provides a robot control system using the remote robot control method.

According to an aspect of the invention, there is provided a remote robot control method using a three-dimensional pointing procedure. The remote control method includes: measuring a distance between a remote controller and a robot; calculating an initial position of the remote controller in an inertial navigation frame of the remote controller; calculating an initial position of the robot in the inertial navigation frame of the remote controller; calculating an origin of the inertial navigation frame of the remote controller in an inertial navigation frame of the robot; calculating a new position of the remote controller in the inertial navigation frame of the remote controller; and calculating a new position of the robot in the inertial navigation frame of the robot.

According to another aspect of the invention, there is provided a robot control system. The robot control system includes: a remote controller operable by a user and a robot movable in accordance with a movement of the remote controller. The remote controller includes: a sensor to provide measurements necessary for calculating orientation and position information of the remote controller; an orientation calculator to calculate an orientation of the remote controller based on the measurements provided by the sensor; a position calculator to calculate a position of the remote controller based on the measurements provided by the sensor; a target position calculator to calculate a target position indicated by the remote controller based on the orientation and position information calculated by the orientation calculator and the position calculator; a coordinate converter to convert the target position calculated by the target position calculator in an inertial navigation frame of the remote controller into a target position shown in an inertial navigation frame of the robot; a command generator to command the robot to move to the converted target position; and a distance sensor to measure a distance between the remote controller and the robot. The robot includes: a navigation controller to driving a navigation motor in response to a command from the command generator; and a sensor to exchange signals with the distance sensor to measure the distance between the remote controller and the robot.

Therefore, the robot control system controls a robot in response to a user's gesture or sign without modifying the structure of the robot.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION OF THE INVENTION

Figure 1:
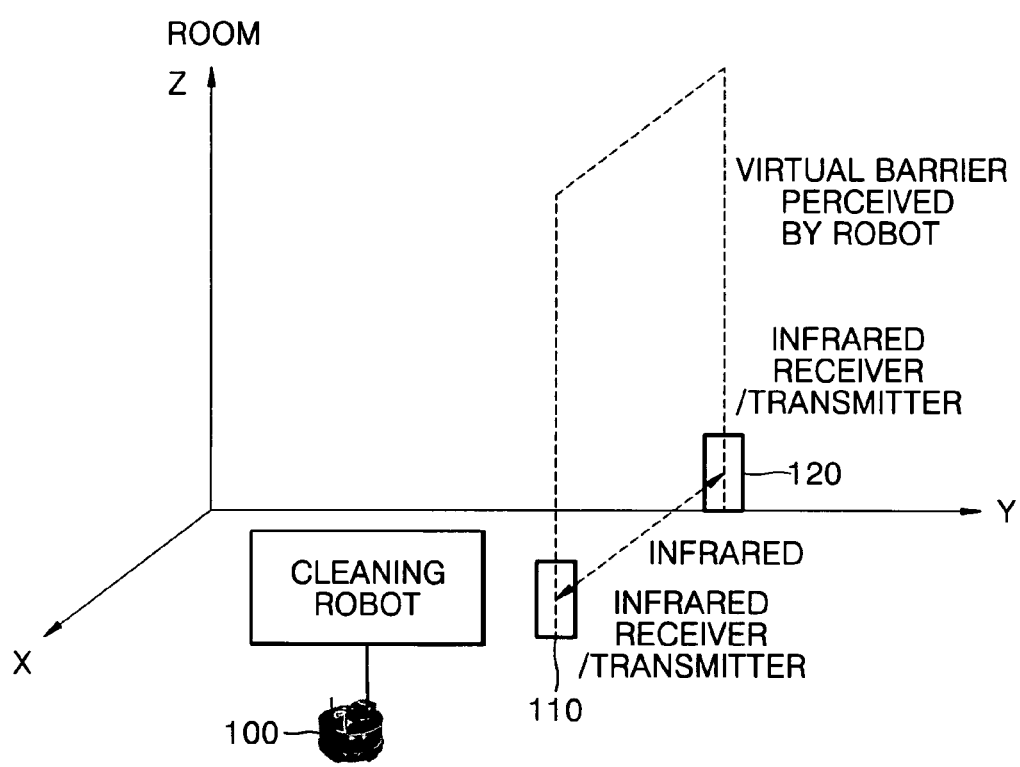
FIG. 1 illustrates an operation of a cleaning robot.

Exemplary embodiments of the invention will now be described below by reference to the attached Figures. The described exemplary embodiments are intended to assist the understanding of the invention, and are not intended to limit the scope of the invention in any way. Like reference numerals in the drawings denote like elements.

Figure 2:
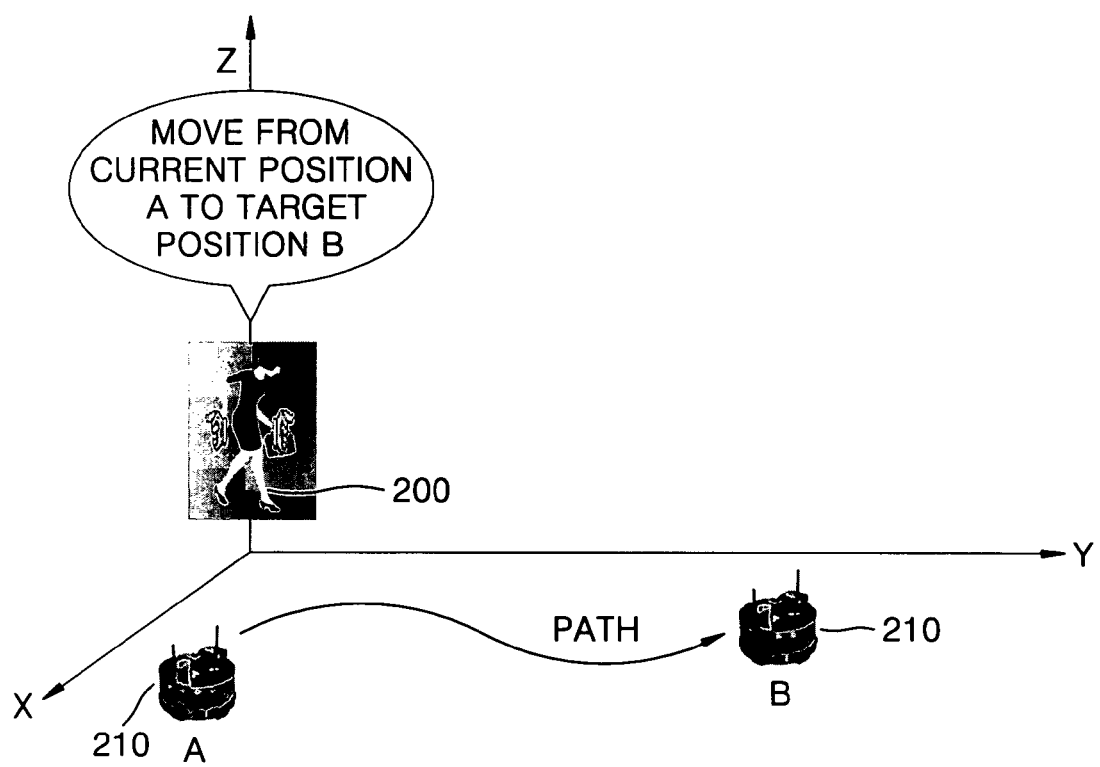
FIG. 2 illustrates a situation where a user commands a robot to change its position.

FIG. 2 illustrates a situation where a user 200 commands a robot 210 to change its position. Referring to FIG. 2, when the user 200 commands the robot 210 to move from a current position A to a target position B, the user 200 may directly point at the target position B or indicate a path from the current position A to the target position B using a hand-held remote control device (hereinafter, referred to as a "remote controller") capable of recognizing a human gesture. The command issued by the user 200 is converted into a command that the robot 210 can comprehend. Then, the robot 210 moves to the target position B according to a navigation algorithm.

Figure 3:
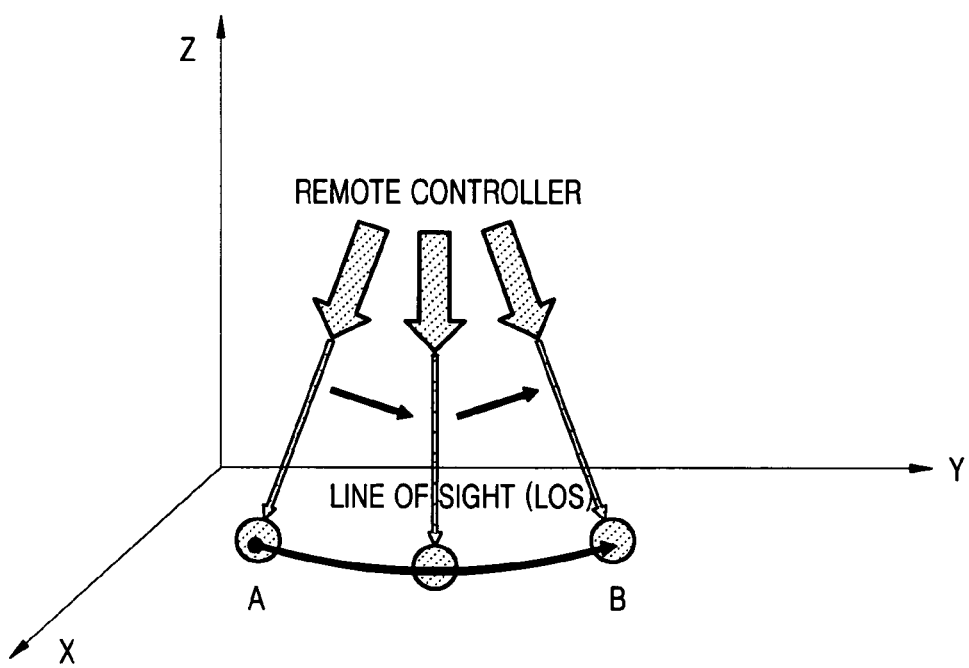
FIG. 3 illustrates the situation of FIG. 2 from a technical perspective.

FIG. 3 illustrates the situation illustrated in FIG. 2 from a technical perspective. Referring to FIG. 3, the robot 210 moves with respect to an X-Y-Z inertial navigation frame, which is a three-dimensional virtual coordinate in which an X-Y plane is parallel to the floor in a room and perpendicular to the direction of gravity. When the user 200 moves the remote controller indicating a position change from the current position A to the target position B, the robot 210 calculates the intersection points (hereinafter, referred to as "target positions") between a line-of-sight (LOS) generated by the remote controller and the X-Y plane. The target positions form a path along which the user 200 wants the robot 210 to move.

Figure 4:
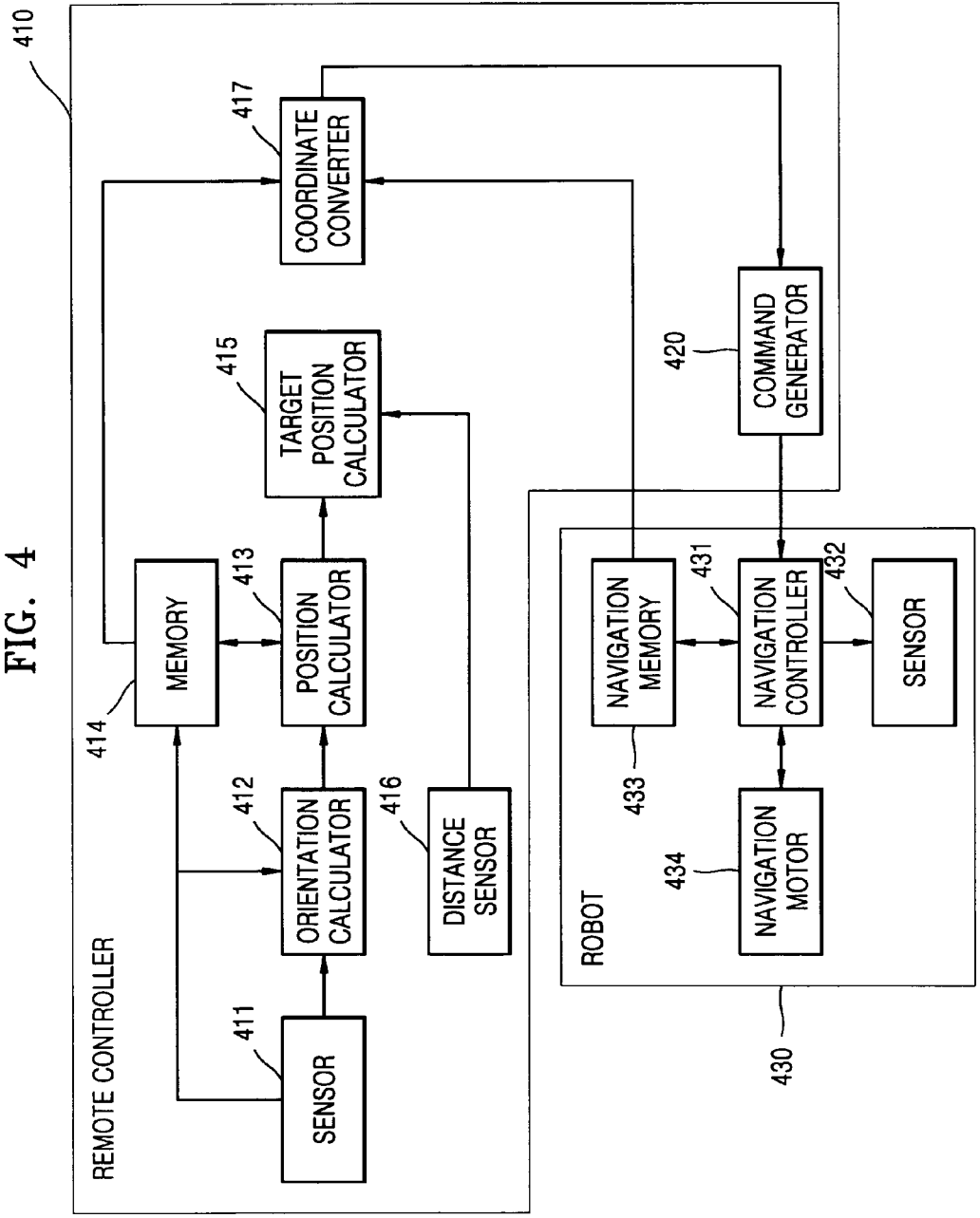
FIG. 4 is a block diagram of a remote controller and a robot according to an embodiment of the invention.

FIG. 4 is a block diagram of a robot control system according to an exemplary embodiment of the invention. Referring to FIG. 4, the robot control system includes a remote controller 410 used by a user and a robot 430 moving in accordance with a movement of the remote controller 410. The remote controller 410 includes a sensor 411, an orientation calculator 412, a position calculator 413, a memory 414, a target position calculator 415, a distance sensor 416, a coordinate converter 417, and a command generator 420. The robot 430 includes a navigation controller 431, a sensor 432, a navigation memory 433, and a navigation motor 434.

The sensor 411 provides measurements necessary for calculating an orientation and a position of the remote controller 410. The sensor 411 may be an accelerometer, a gyroscope, or a magnetic sensor, or a combination of the same.

The orientation calculator 412 calculates the orientation of the remote controller 410 in an inertial navigation frame of the remote controller 410 based on the measurements provided by the sensor 411. Here, the orientation is represented by the roll, pitch and yaw angles ($\Phi,\theta,\Psi$), that is, the Euler angles.

The position calculator 413 calculates the position of the remote controller 410 in the inertial navigation frame of the remote controller 410 based on the measurements provided by the sensor 411 and a value output from the orientation calculator 412. The calculation method used by the orientation calculator 412 and the position calculator 413 is based on the inertial navigation system (INS) theory.

The INS theory is used when a system recognizes its position in a two-dimensional or three-dimensional space on its own without an external system providing absolute position information such as a global positioning system (GPS). The INS theory has been used for airplanes, ships, and military systems for navigation purposes (See "The Global Positioning System & Inertial Navigation," McGraw-Hill, 1999, by J. A. Farrel and Matthew Barth, and "Theory and Application of Kalman Filtering," Magellan Book Co., 1993, by G. Minkler and J. Minkler). The INS theory has also been used to control the navigation of a robot (See "Enhancement of the Inertial Navigation System for the Morpheus Autonomous Underwater Vehicles," IEEE Journal of Oceanic Engineering, vol. 26, no. 4, pp. 548-560, October 2001, by G. Grenon, P. E. An, S. M. Smith, and A. J. Healey).

The INS theory for controlling the navigation of a robot is used to recognize the position of the robot in the invention. As the INS theory is well documented in the books and journals mentioned above, which are incorporated by reference herein, a detailed description of the INS theory will not be included here.

The measurements output from the sensor 411 and values output from the orientation calculator 412 and the position calculator 413 are stored in the memory 414. The target position calculator 415 calculates a target position that a user actually indicated based on data stored in the memory 414 and using a predetermined mathematical algorithm.

Here, the calculations performed by the orientation calculator 412, the position calculator 413, and the target position calculator 415 take place in the inertial navigation frame of the remote controller 410. However, the robot 430 moves with respect to the X-Y-Z inertial navigation frame. Therefore, a target position calculated by the target position calculator 415 in the inertial navigation frame of the remote controller 410 must be converted into a target position in the X-Y-Z inertial navigation frame of the robot 430. To this end, the coordinate converter 417 uses the data stored in the memory 414 included in the remote controller 410, data stored in the navigation memory 433 included in the robot 430, and a distance between the remote controller 410 and the robot 430 provided by the distance sensor 416. The distance sensor 416 may be an ultrasonic sensor or an infrared sensor.

The target position converted by the coordinate converter 417 is transmitted to the command generator 420. The operation of the coordinate converter 417 will later be described in detail with reference to FIG. 11.

The navigation controller 431 drives the navigation motor 434 in response to a command generated by the command generator 420 to control the robot 430. The navigation controller 431 calculates an initial position of the robot 430 in the inertial navigation frame of the remote controller 410 and calculates the origin of the inertial navigation frame of the remote controller 410 in the X-Y-Z inertial navigation frame of the robot 430. Thereafter, the navigation controller 431 calculates the position of the robot 430 in the inertial navigation frame of the remote controller 410 and the position of the robot 430 in the X-Y-Z inertial navigation frame of the robot 430 with respect to a final target position or a target position on a navigation path.

The navigation memory 433 stores information regarding coordinates converted by the coordinate converter 417 and transmits the information to the navigation controller 431. The sensor 432 interacts with the distance sensor 416 of the remote controller 410 to measure the distance between the remote controller 410 and the robot 430. The operation of the sensor 432 will later be described in detail with reference to FIG. 6.

Figure 5:
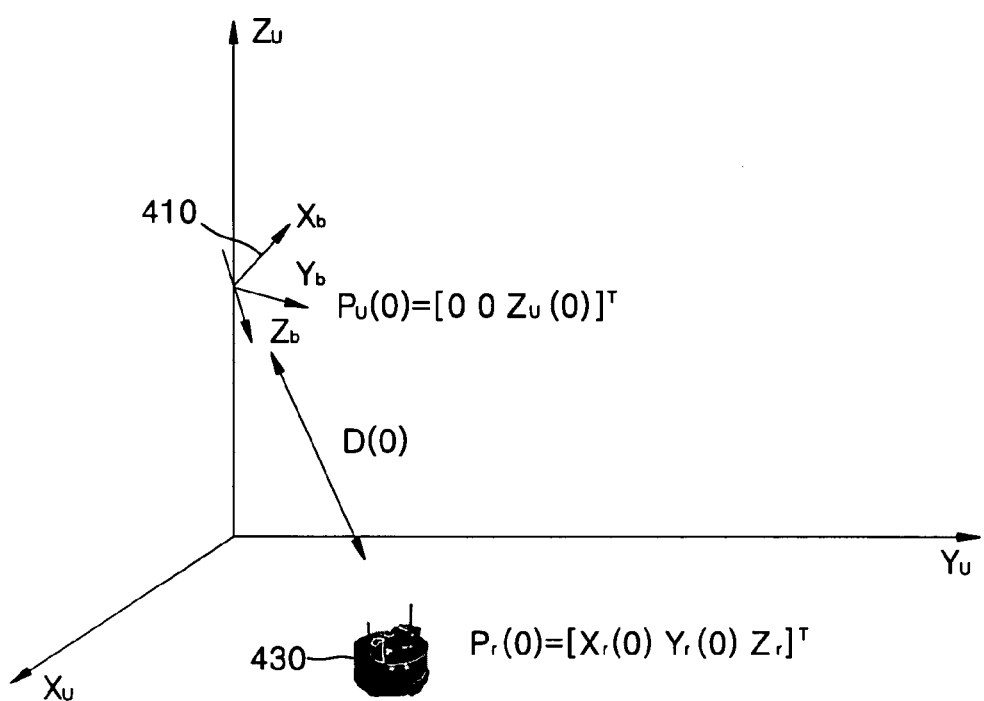
FIG. 5 illustrates an initial positional relationship between the robot and the remote controller shown in a navigation frame of the remote controller.

FIG. 5 illustrates an initial positional relationship between the robot 430 and the remote controller 410 in the inertial navigation frame of the remote controller 410. Referring to FIG. 5, the body frame of the remote controller 410 is expressed as $X_b$-$Y_b$-$Z_b$, with the axis $Z_b$ pointing toward the robot 430, which the inertial navigation frame of the remote controller 410 is expressed as $X_u$-$Y_u$-$Z_u$.

A position coordinate $P_u(t)$ in the inertial navigation frame of the remote controller 410 and a position coordinate $P_r(t)$ of the robot 430 are defined as follows.

$$P_u(t)=[X_u(t),Y_u(t),Z_u(t)]^T \quad (1)$$

$$P_r(t)=[X_r(t),Y_r(t),Z_r(t)]^T, \quad (2)$$

where $X_u$ and $Y_u$ coordinate values of the remote controller 410 in the inertial navigation frame of the remote controller 410 are set to zero. The XY plane in the navigation frame of the remote controller 410 is perpendicular to the direction of gravity in this exemplary embodiment. Accordingly, the XY plane in the navigation frame of the remote controller 410 overlaps the floor of the room that the robot 430 should navigate because the floor is also perpendicular to the direction of gravity.

The initial positional relationship between the remote controller 410 and the robot 430 is given by $P_u(t)=[X_u(t),Y_u(t),Z_u(t)]^T$ and $P_r(t)=[X_r(t),Y_r(t),Z_r(t)]^T$. As described above, the initial X and Y positions of the remote controller 410 was set to zero. Since the robot travels on a flat surface, the coordinate value $Z_r$ of the robot 430 on the Z-axis can be set to zero. However, since the height of the robot 430 varies according to its size, the position of the robot 430 on the Z-axis is set to $Z_r$. Accordingly, the initial position of the remote controller 410 is $P_u(0)=[0,0,Z_u(0)]^T$ in the inertial navigation frame and that of the robot 430 is $P_r(0)=[X_r(0),Y_r(0),Z_r]^T$ in the X-Y-Z inertial navigation frame.

The relationship between the position of the remote controller 410 and that of the robot 430 is defined as follows.

$$C_b^u i_{bz} D(0)=P_r(0)-P_u(0)=[X_r(0),Y_r(0),Z_r-Z_u(0)]^T, \quad (3)$$

where $i_{bz}=[0\ 0\ 1]^T$ is a unit vector in the Z-axis direction of the body frame of the remote controller 410, D(0) denotes an initial distance between the remote controller 410 and the robot 430, and $C_b^u$ denotes a direction cosine matrix (DCM). The DCM is a special matrix used to specify the relationship between two coordinate systems. $C_b^u$ in Equation 3 is used to convert a vector in the body frame of the remote controller 410 into a vector in the inertial navigation frame of the remote controller 410. The DCM $C_b^u$ is defined as $$C_b^n = \begin{bmatrix} \theta_c\Psi_c - \Phi_c\Psi_s + \Phi_s\theta_s\Psi_c\Phi_s\Psi_s + \Phi_c\theta_s\Psi_c \\ \theta_c\Psi_s\Phi_c\Psi_s + \Phi_s\theta_s\Psi_s - \Phi_s\Psi_c + \Phi_c\theta_s\Psi_s \\ -\theta_s \quad \Phi_s\theta_c \quad \Phi_c\theta_c \end{bmatrix}, \quad (4)$$

where a subscript c represents a cosine function, and a subscript s represents a sine function. ($\Phi,\theta,\Psi$) denote the roll, pitch, and yaw angles, otherwise known as the Euler angles, and are used for specifying a rotational relationship between two coordinate systems. That is, the Euler angles used in Equation 3 indicate the rotational relationship between the body frame of the remote controller 410 and the inertial navigation frame of the remote controller 410.

In Equation 3, when the DCM $C_b^u$ and the distance between the remote controller 410 and the robot 430 are known, the remaining three unknowns $Z_u(0), X_r(0)$, and $Y_r(0)$ can be given by Equation 1. The orientation calculator 412 of the remote controller 410 calculates the DCM $C_b^u$ using the measurements provided by the sensor 411 of FIG. 4.

The sensor 411 according to an exemplary embodiment of the invention includes a three-axis accelerometer, a three-axis gyroscope, and a three-axis magnetic sensor. Measurement axes are adjusted to the axes $X_b, Y_b$, and $Z_b$ of the body frame of the remote controller 410. The sensor 411 may be composed of, for example, a combination of the three-axis accelerometer, the three-axis gyroscope, and the three-axis magnetic sensor, a combination of the three-axis accelerometer and the three-axis gyroscope, or a combination of the three-axis gyroscope and the three-axis magnetic sensor.

Based on a value read from the three-axis accelerometer, the roll angle and the pitch angle are given by $$\begin{bmatrix} \Phi \\ \theta \end{bmatrix} = \begin{bmatrix} \arctan2(-A_{by}, -A_{bz}) \\ \arctan2(A_{bx}, \sqrt{(A_{by}^2 + A_{bz}^2)}) \end{bmatrix}, \quad (5)$$

where $A_{bx}, A_{by}$ and $A_{bz}$ denote acceleration measurements on the $X_b, Y_b$, and $Z_b$ axes of the body frame of the remote controller 410, respectively, obtained from the three-axis accelerometer.

Based on the roll and the pitch angles, and the values read from the three-axis magnetic sensor calculated in Equation 5, the yaw angle is given by $$\begin{bmatrix} M_{ux} \\ M_{uy} \\ M_{uz} \end{bmatrix} = \begin{bmatrix} \cos\theta & \sin\theta\sin\Phi & \sin\theta\cos\Phi \\ 0 & \cos\Phi & -\sin\Phi \\ -\sin\theta & \cos\theta\sin\Phi & \cos\theta\cos\Phi \end{bmatrix} \begin{bmatrix} M_{bx} \\ M_{by} \\ M_{bz} \end{bmatrix}, \quad (6)$$

where $M_{bx}$, $M_{by}$, and $M_{bz}$ denote magnetic measurements on the $X_b$, $Y_b$, and $Z_b$ axes of the body frame of the remote controller 410, respectively, obtained from the three-axis magnetic sensor, and $M_{ux}$, $M_{uy}$, and $M_{uz}$ are magnetic measurements in the inertial navigation frame of the remote controller 410. The yaw angle can be calculated by substituting $M_{ux}$ and $M_{uy}$ in Equation 7.

$$\Psi = \tan^{-1}\left(\frac{-M_{uy}}{M_{ux}}\right) \quad (7)$$

Therefore, the DCM $C_b^u$ can be calculated by substituting the roll, the pitch, and the yaw angles given by Equation 5 and Equation 7 in Equation 4.

Figure 6:
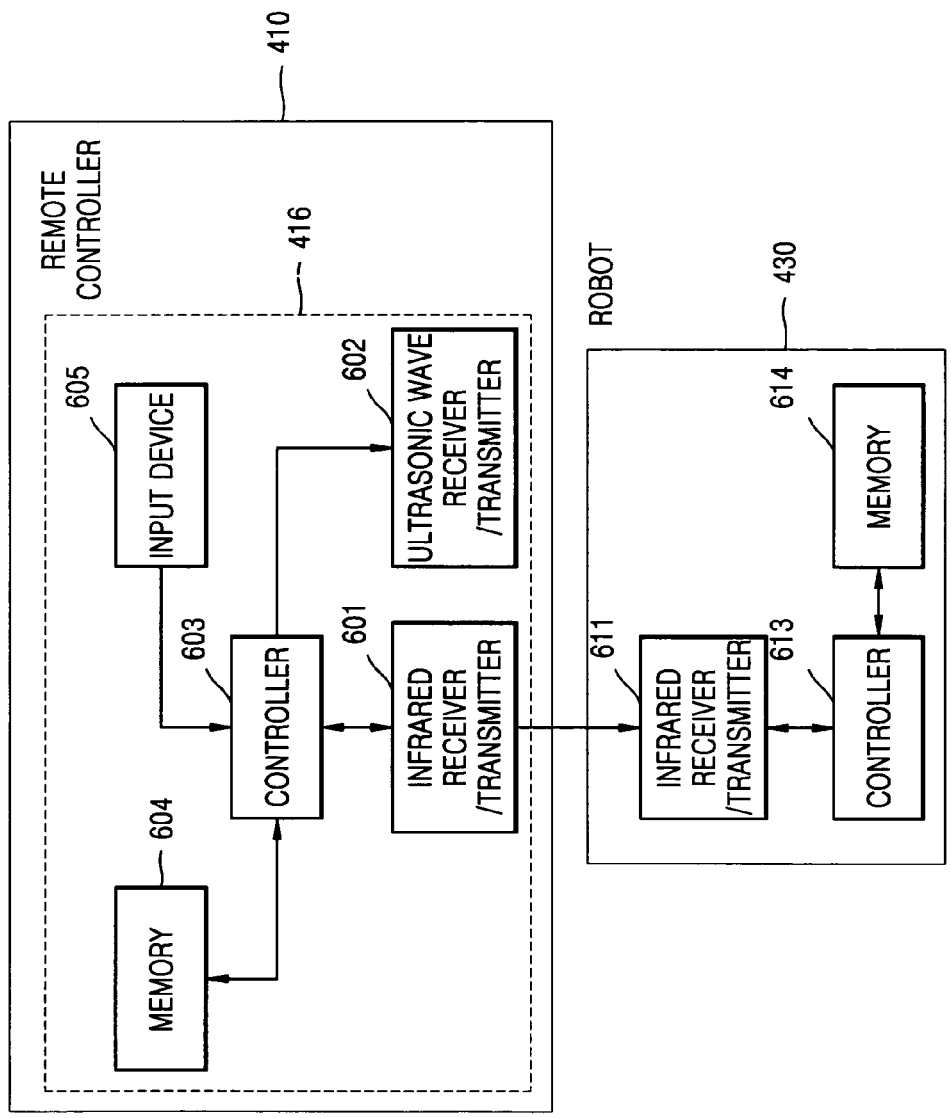
FIG. 6 is a block diagram of a distance sensor of the remote controller and a robot.

The initial distance D(0) between the remote controller 410 and the robot 430 is obtained by interactions between the distance sensor 416 of the remote controller 410 of FIG. 4 and the sensor 432 of the robot 430 of FIG. 4, as illustrated in FIG. 6. Referring to FIG. 6, the distance sensor 416 of the remote controller 410 includes an infrared receiver/transmitter 601, an ultrasonic wave receiver/transmitter 602, a controller 603, a memory 604, and an input device 605. The sensor 432 of the robot 430 includes an infrared receiver/transmitter 611, a controller 613, and a memory 614. The infrared receivers/transmitters 601 and 611 are installed such that the remote controller 410 can be synchronized with the robot 430. The ultrasonic wave receiver/transmitter 602 is installed to measure the distance between the remote controller 410 and the robot 430.

Figure 7:
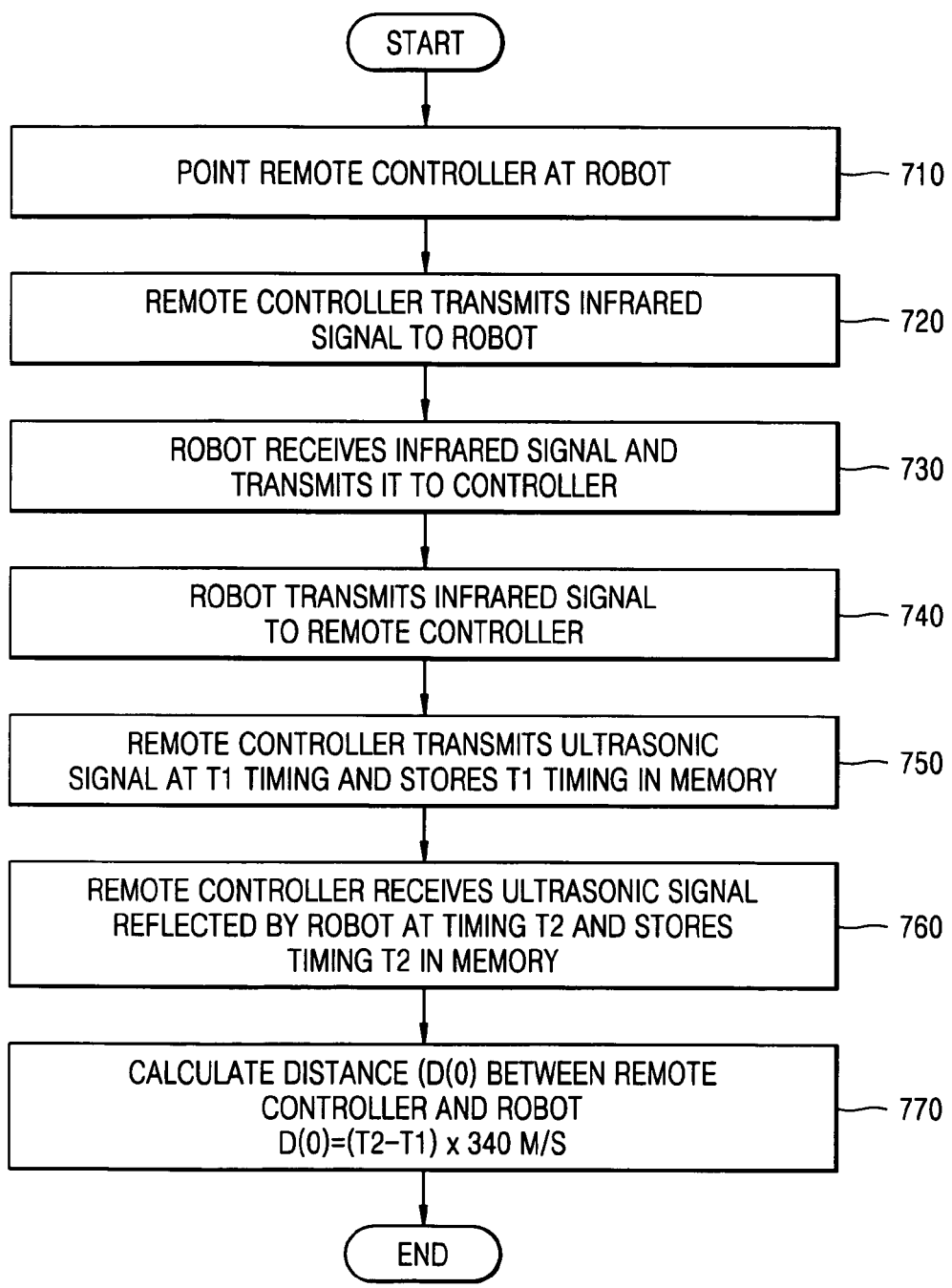
FIG. 7 is a flowchart illustrating a method of measuring a distance between the remote controller and the robot.

The process of measuring the distance between the remote controller 410 and the robot 430 will be described with reference to a flowchart of FIG. 7 in conjunction with FIG. 6. Referring to FIG. 7, when the input device 605, which may be implemented as a button, is pressed, the process of calculating the distance between the remote controller 410 and the robot 430 is started. When the remote controller 410 points at the robot 430 (Operation 710), the remote controller 410 transmits an infrared signal to the robot 430 (Operation 720). The robot 430 detects the infrared signal and transmits the infrared signal to the controller 613 (Operation 730). To indicate the reception of the infrared signal transmitted from the remote controller 410, the controller 613 drives the infrared receiver/transmitter 611 and transmits the infrared signal to the remote controller 410 (Operation 740).

The remote controller 410, which receives the infrared signal transmitted from the infrared receiver/transmitter 611, controls the ultrasonic wave receiver/transmitter 602 to generate an ultrasonic signal at timing T1 and store the timing T1 in the memory 604 (Operation 750). Then, the remote controller 410 receives the ultrasonic signal retro-reflected by the robot 403 at timing T2 and stores the timing T2 in the memory 604 (Operation 760). The initial distance D(0) between the remote controller 410 and the robot 430 is calculated (Operation 770) using the difference between the timing T2 and the timing T1 as follows.

$$D(0) = (T2-T1)*340 \text{ m/s}, \quad (8)$$

where 340 m/s is the speed of an ultrasonic wave.

Until now, the initial orientation, the positional relationship, and the initial distance between the remote controller 410 and the robot 430 have been described. From now on, a situation will be described where the user moves the remote controller 410 and points at the final target position that the robot should move to or a path along which the robot 430 should move.

Figure 8:
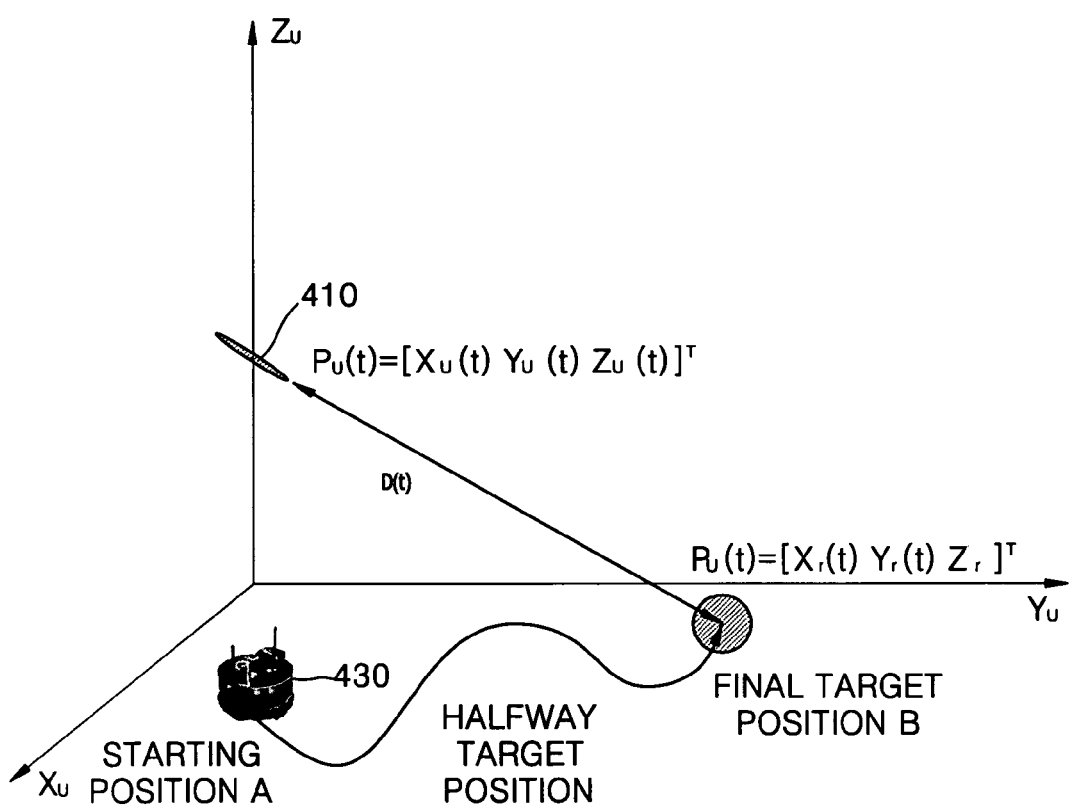
FIG. 8 illustrates a situation where a user points to a final target position B to which the robot should go by moving the remote controller.

FIG. 8 illustrates the situation where the user points at the final target position B to which the robot 430 should move by moving the remote controller 410. Referring to FIG. 8, the robot is currently at a starting position A. The position relationship between the starting position A and the final target position B is similar to Equation 3 and given by $$C_b^u(t)i_{bz}D(t) = P_r(t) - P_u(t) = [X_r(t) - X_u(t), Y_r(t) - Y_u(t), Z_r - Z_u(t)]^T, \quad (9)$$

where D(t) indicates the distance between the remote controller 410 and a top surface of the robot 430 measured when the robot 430 arrives at the final target position B. $P_r(t)$ indicates $X_r$-$Y_r$-$Z_r$ coordinates of the robot 430 in the inertial navigation frame of the remote controller 410 when the robot 430 arrives at the final target position B. $P_u(t)$ indicates $X_u$-$Y_u$-$Z_u$ coordinates of the remote controller 410 in the inertial navigation frame of the remote controller 410 when the remote controller 410 points at the final target position B.

A velocity of the remote controller 410 in the inertial navigation frame of the remote controller 410 $P_u(t)=[X_u(t), Y_u(t), Z_u(t)]$ and angular velocities $\Phi$, $\theta$, and $\Psi$ can be calculated using the accelerometer, the gyroscope, and the magnetic sensor included in the sensor 411 of the remote controller 410 as well as the INS theory as follows:

$$\dot{P}_u = C_b^u V_u \quad (10)$$

$$\dot{V}_u = C_b^u A_b - G$$

$$\dot{\Phi} = \omega_{bx} + (\omega_{by}\sin\Phi + \omega_{bz}\cos\Phi)\tan\theta$$

$$\dot{\theta} = \omega_{by}\cos\Phi - \omega_{bz}\sin\Phi$$

$$\dot{\Psi} = \frac{\omega_{by}\sin\Phi + \omega_{bz}\cos\Phi}{\cos\Phi},$$

where $A_b=[A_{bx}A_{by}A_{bz}]^T$ denotes acceleration measurements output from the three-axis accelerometer, and $\omega_{bx}$, $\omega_{by}$, and $\omega_{bz}$ denote angular velocity measurements output from the three-axis gyroscope, and $G=[0\,0\,9.8]^T$ denotes the acceleration of gravity.

Since $C_b^u$ and $P_u(t)$ are given by Equation 10, in Equation 9, the unknowns are $X_r(t)$, $Y_r(t)$, and D(t). Since Equation 9 is a cubic equation, the unknowns $X_r(t)$, $Y_r(t)$, and D(t) can be easily calculated. The position information of the robot calculated in this way is a value in the inertial navigation frame of the remote controller 410. To control the robot 430, it is required to convert the value in the navigation frame of the remote controller 410 into a value in the inertial X-Y-Z navigation frame of the robot 430.

Figure 9:
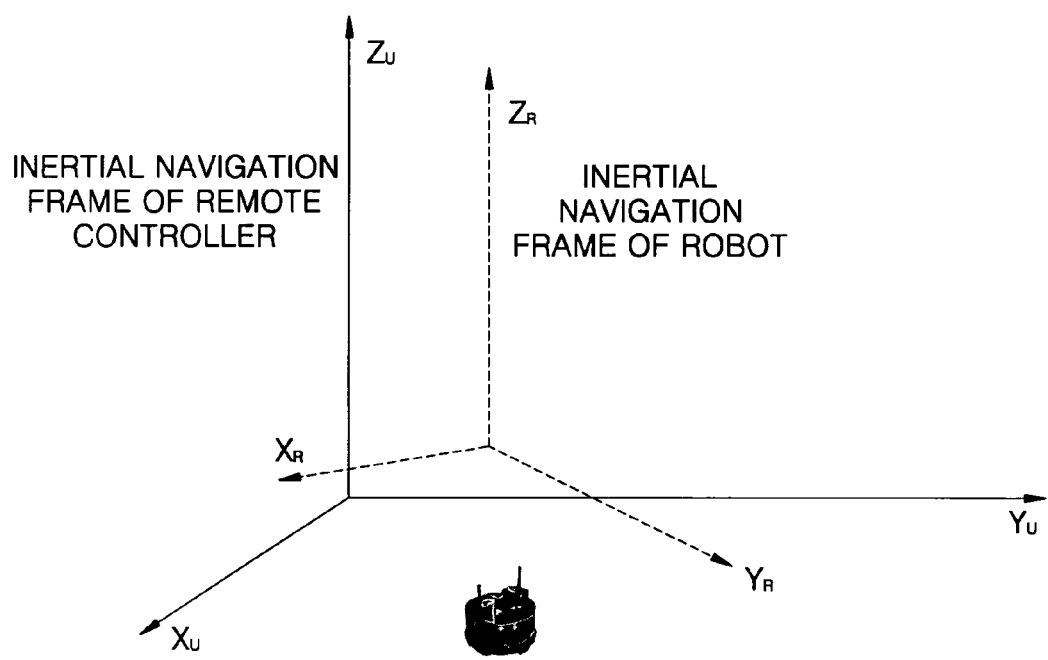
FIG. 9 illustrates a relationship between navigation frames of the remote controller and the robot.

Referring to FIG. 9, the XY plane of each of the navigation frames of the remote controller 410 and the robot 430 is perpendicular to the direction of gravity. Considering that the robot 430 is designed to travel on the floor of the room, it is natural that the XY plane of the navigation frame of the robot 430 is perpendicular to the direction of gravity.

As described above, the relationship between the two coordinate systems is expressed by the DCM and calculated using the Euler angles. Of the three Euler angles, the roll angle and the pitch angle represent relative inclination of the two coordinate systems. Since the XY planes of the navigation frames of the remote controller 410 and the robot 430 are parallel to each other, the roll and the pitch angles are zero. Therefore, the only angle that needs to be calculated is a difference in the yaw angles between the inertial navigation frame of the remote controller 410 and the inertial navigation frame of the robot 430.

Since the remote controller 410 includes a magnetic sensor, it can measure its absolute yaw angle. The mobile robot 430, which also includes a magnetic sensor, can measure its absolute yaw angle. The absolute yaw angle is a value measured in a reference frame based on the North Pole. Hence, the difference between the yaw angles of the navigation frames of the remote controller 410 and the robot 430 can be easily calculated.

Figure 10:
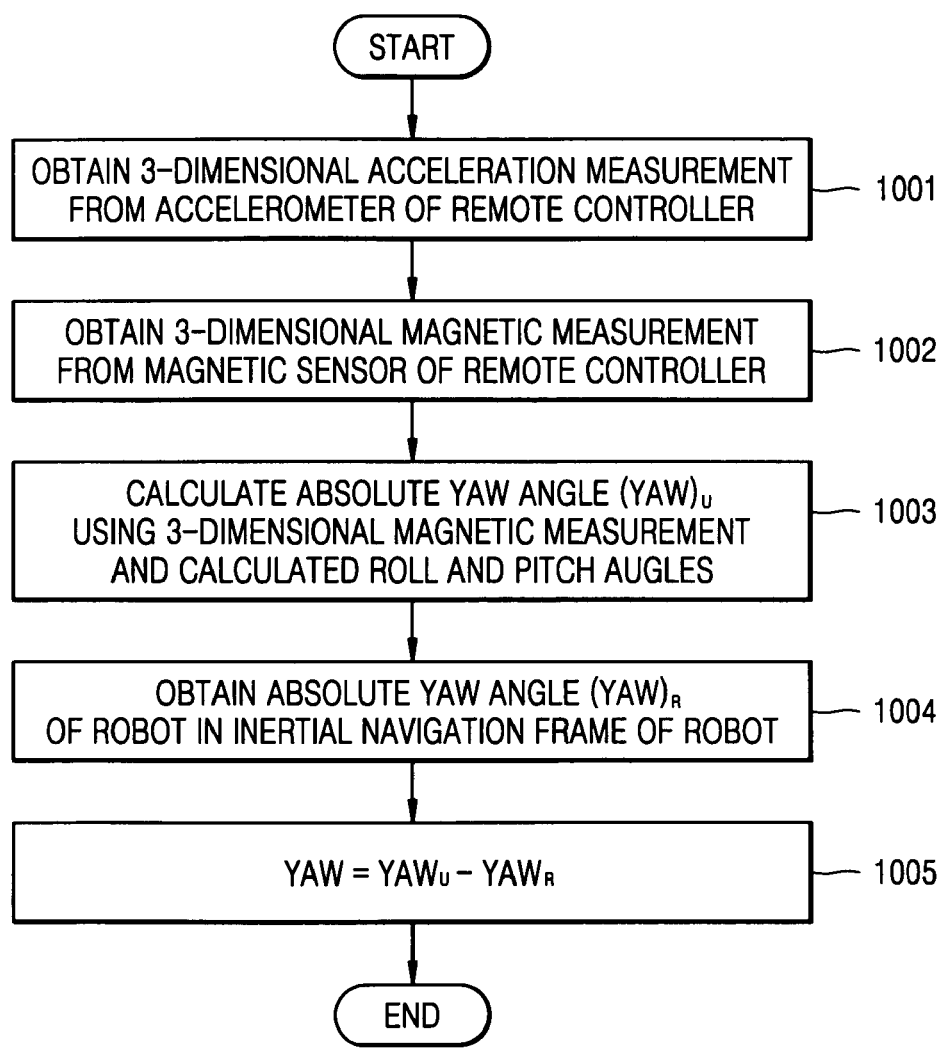
FIG. 10 is a flowchart illustrating a method of calculating a relative yaw angle of the navigation frames of the remote controller and the robot.

FIG. 10 is a flowchart illustrating a method of calculating a relative yaw angle of the navigation frames of the remote controller 410 and the robot 430. Referring to FIG. 10, a three-axis acceleration measurement is obtained from the accelerometer included in the remote controller 410 (Operation 1001), and a three-axis magnetic measurement is obtained from the magnetic sensor included in the remote controller 410 (Operation 1002). An absolute yaw angle $yaw_U$ of the remote controller 410 is calculated using the three-axis magnetic measurement as well as the roll angle and the pitch angle calculated in Equation 5 based on the three-axis magnetic measurement (Operation 1003). The absolute yaw angle $yaw_U$ of the remote controller 410 is given by Equations 5 and 6. An absolute yaw angle $yaw_R$ of the robot 430 is calculated by the navigation controller 431 of the robot 430 (Operation 1004). Then, a relative yaw angle between the inertial navigation frame of the remote controller 410 and that of the robot 430 is calculated by subtracting the absolute yaw angle $yaw_R$ of the robot 430 from the absolute yaw angle $yaw_U$ of the remote controller 410 (Operation 1005).

Figure 11:
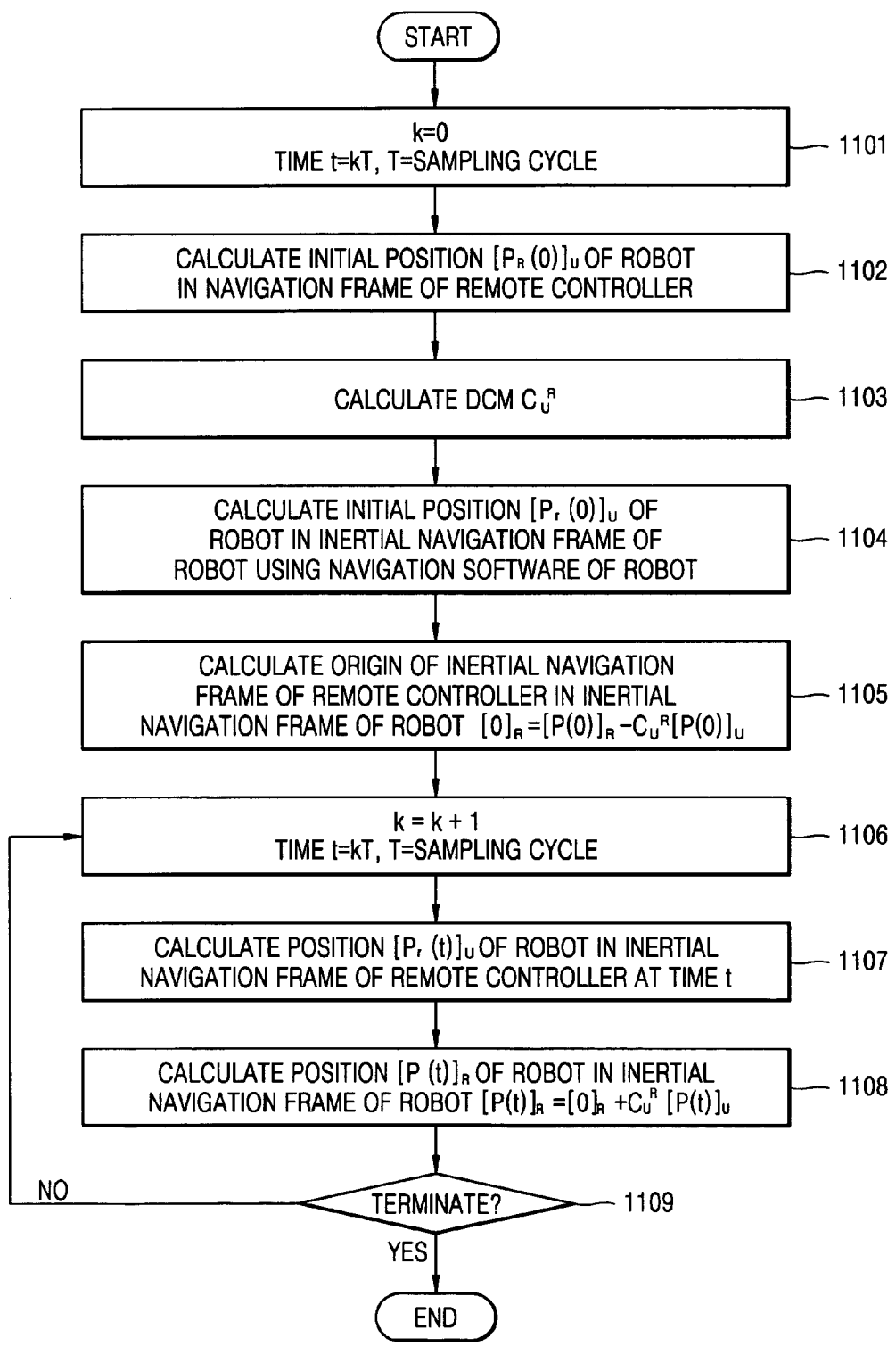
FIG. 11 is a flowchart illustrating the operation of a coordinate converter illustrated in FIG. 4.

FIG. 11 is a flowchart illustrating a data flow in the coordinate converter 417. Referring to FIG. 11, time t is set to kT using a k sampling time and a T sampling cycle. The k sampling time is set to zero (Operation 1101). An initial position $[P_r(0)]_U$ of the robot 430 shown in the navigation frame of the remote controller 410 is calculated (Operation 1102). $[P_r(0)]_U$ is given by Equations 3 though 7.

After calculating the difference between the yaw angle of the inertial navigation frame of the remote controller 410 and that of the inertial X-Y-Z navigation frame of the robot 430, the DCM $C_U^R$ that specifies the relationship between the two coordinate systems is calculated (Operation 1103). Then, an initial position $[P_r(0)]_R$ of the robot 430 shown in the inertial X-Y-Z navigation frame of the remote controller 410 is calculated by the navigation controller 431 of the robot 430 (Operation 1104). The origin $[0]_R$ of the navigation frame of the remote controller 410 in the inertial X-Y-Z navigation frame of the robot 430 is given by $$[0]_R = [P_r(0)]_R - C_U^R [P_r(0)]_U \quad (11)$$

where $[\ ]_U$ and $[\ ]_R$ denote the inertial navigation frame of the remote controller 410 and the inertial X-Y-Z navigation frame of the robot 430, respectively. $C_U^R$ represents the DCM specifying the rotational relationship between the navigation frames of the remote controller 410 and the robot 430 and has the same form as the DCM in Equation 4. The value of the DCM is obtained by substituting the relative yaw angle given by Equation 10 in Equation 11 as the yaw angle $\Psi$ while the roll angle and pitch angle are set to $\Phi=0$ and $\theta=0$, respectively.

Thereafter, the k sampling time is increased by one (Operation 1106), and the position $[P_r(t)]_U$ of the robot 430 in the navigation frame of the remote controller 410 at the time $t(=t+kT)$ is calculated (Operation 1107). Accordingly, the position $[P_r(t)]_R$ of the robot 430 shown in the navigation frame of the robot 430 is calculated (Operation 1108) as follows.

$$[P_r(t)]_R = [0]_R + C_U^R [P_r(t)]_U \quad (12)$$

After the position of the robot 430 with respect to the final target position is calculated, the operation of the coordinate converter 417 is terminated (Operation 1109). When the target positions on the path that the robot 430 navigates are calculated, the coordinate converter 417 repeats Operations 1106 through 1108.

As described above, a robot control system according to the invention moves a robot by using a remote controller that is manipulated by a user. Without installing expensive image recognition hardware equipment in the robot, the robot control system can move the robot by calculating a positional relationship between navigation frames of the remote controller and the robot and converting the respective coordinates.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A remote robot control method using a three-dimensional pointing procedure, the remote control method comprising:
   (a) measuring a distance between a remote controller and a robot;
   (b) calculating an initial position of the remote controller in an inertial navigation frame of the remote controller;
   (c) calculating an initial position of the robot in the inertial navigation frame of the remote controller;
   (d) calculating an origin of the inertial navigation frame of the remote controller in an inertial navigation frame of the robot;
   (e) calculating a new position of the remote controller in the inertial navigation frame of the remote controller;
   (f) calculating a new position of the robot in the inertial navigation frame of the robot, and
   (g) controlling said robot based on said operations (a)-(f).

2. The method of claim 1, wherein measuring the distance between the remote controller and the robot comprises:
   pointing the remote controller at the robot;
   transmitting a first infrared signal from the remote controller to the robot;
   transmitting a second infrared signal from the robot to the remote controller to notify the remote controller that the robot has detected and received the first infrared signal;
   transmitting an ultrasonic signal from the remote controller to the robot at timing T1;
   receiving an ultrasonic signal, at the remote controller, reflected by the robot at timing T2; and
   calculating an initial distance between the remote controller and the robot by using a difference between the timing T2 and the timing T1.

3. The method of claim 2, further comprising storing the timing T1 and the timing T2 in memory.

4. The method of claim 2, wherein an initial distance D(O) between the remote controller and the robot is given by D(O)= (T2-T1) * a speed of an ultrasonic wave.

5. The method of claim 4, wherein the speed of the ultrasonic wave is approximately 340m/s.

6. The method of claim 1, wherein, when calculating the initial position of the remote controller in the inertial navigation frame of the remote controller the initial position of the remote controller is given by $P_u(0)=[0, 0, Z_u(0)]^T$ when a position coordinate of the remote controller is $P_u(t)=[X_u(t), Y_u(t), Z_u(t)]^T$.

7. The method of claim 6, wherein, when calculating the initial position of the robot in the inertial navigation frame of the remote controller, the initial position of the robot is given by $P_r(0)=[X_r(0),Y_r(0),Z_r]^T$ when a position coordinate of the robot is $P_r(t)=[X_r(t),Y_r(t),Z_r(t)]^T$, where $Z_r$ denotes a height of the robot according to its size.

8. The method of claim 7, wherein a positional relationship between the remote controller and the robot is given by $C_b^u i_{bz} D(0) = P_r(0) - P_u(0) = [X_r(0), Y_r(0), Z_r - Z_u(0)]^T$, where $i_{bz}=[0\ 0\ 1]^T$ is a unit vector in a Z-axis direction of a body frame of the remote controller, D(0) denotes the initial distance between the remote controller and the robot, and $C_b^u$ denotes a direction cosine matrix.

9. The method of claim 8, wherein the direction cosine matrix $C_b^u$ is given by $$C_b^n = \begin{bmatrix} \theta_c \Psi_c - \Phi_c \Psi_s + \Phi_s \theta_s \Psi_c \Phi_s \Psi_s + \Phi_c \theta_s \Psi_c \\ \theta_c \Psi_s \Phi_c \Psi_s + \Phi_s \theta_s \Psi_s - \Phi_s \Psi_c + \Phi_c \theta_s \Psi_s \\ -\theta_s \quad \Phi_s \theta_c \quad \Phi_c \theta_c \end{bmatrix},$$

where a subscript c represents a cosine function, a subscript s represents a sine function, and $(\Phi,\theta,\Psi)$ denotes roll, pitch, and yaw angles, respectively.

10. The method of claim 9, wherein the roll angle $\Phi$ and the pitch angle $\theta$ are given by $$\begin{bmatrix} \Phi \\ \theta \end{bmatrix} = \begin{bmatrix} \arctan2(-A_{by}, -A_{bz}) \\ \arctan2(A_{bx}, \sqrt{(A_{by}^2 + A_{bz}^2)}) \end{bmatrix},$$

where $A_{bx}, A_{by}$ and $A_{bz}$ denote acceleration measurements on $X_b, Y_b$, and $Z_b$ axes of the body frame of the remote controller, respectively, obtained from a three-axis accelerometer included in the remote controller.

11. The method of claim 9, wherein the yaw angle $\Psi$ is given by $$\Psi = \tan^{-1}\left(\frac{-M_{uy}}{M_{ux}}\right),$$

where $M_{ux}, M_{uy}$ and $M_{uz}$ denote magnetic measurements in the inertial navigation frame of the remote controller and are given by $$\begin{bmatrix} M_{ux} \\ M_{uy} \\ M_{uz} \end{bmatrix} = \begin{bmatrix} \cos\theta & \sin\theta\sin\Phi & \sin\theta\cos\Phi \\ 0 & \cos\Phi & -\sin\Phi \\ -\sin\theta & \cos\theta\sin\Phi & \cos\theta\cos\Phi \end{bmatrix} \begin{bmatrix} M_{bx} \\ M_{by} \\ M_{bz} \end{bmatrix},$$

where $M_{bx}, M_{by}$ and $M_{bz}$ denote magnetic measurements on the $X_b, Y_b$, and $Z_b$ axes of the body frame of the remote controller, respectively, obtained from a three-axis magnetic sensor included in the remote controller.

12. The method of claim 1, wherein, when calculating the initial position of the robot in the inertial navigation frame of the remote controller, the initial position of the robot is given by $P_r(0)=[X_r(0),Y_r(0),Z_r]^T$ when a position coordinate of the robot is $P_r(t)=[X_r(t),Y_r(t),Z_r(t)]^T$, where $Z_r$ denotes a height of the robot according to its size.

13. The method of claim 1, wherein calculating the origin of the inertial navigation frame of the remote controller in the inertial navigation frame of the robot comprises:

calculating a difference between an absolute yaw angle of the remote controller in the navigation frame of the remote controller and an absolute yaw angle of the robot in the navigation frame of the robot; and calculating the direction cosine matrix $C_U^R$ specifying a relationship between the inertial navigation frame of the remote controller and the inertial navigation frame of the robot, wherein the origin $[0]_R$ of the inertial navigation frame of the remote controller in the inertial navigation frame of the robot being given by $[0]_R = [P_r(0)]_R - C_U^R [P_r(0)]_U$, where $[P_r(0)]_U$ denotes the initial position of the robot in the inertial navigation frame of the remote controller and $[P_r(0)]_R$ denotes the initial position of the robot in the navigation frame of the remote controller.

14. The method of claim 1, wherein calculating a new position of the remote controller in the inertial navigation frame of the remote controller and calculating a new position of the robot in the inertial navigation frame of the robot are performed by increasing a k sampling time by one for every T sampling cycle, where a sampling time t is given by t=t+kT.

15. The method of claim 1, wherein calculating a new position of the remote controller in the inertial navigation frame of the remote controller comprises:

calculating the positional relationship between a starting position at which the robot is located and a target position to which the robot should move by $C_b^u(t) i_{bz} D(t) = P_r(t) - P_u(t) = [X_r(t) - X_u(t), Y_r(t) - Y_u(t), Z_r - Z_u(t)]^T$ wherein the position coordinate of the remote controller in the navigation frame of the remote controller is $P_u(t)=[X_u(t), Y_u(t), Z_u(t)]^T$, the remote controller points at the target position, and the position coordinate of the robot in the inertial navigation frame of the remote controller is $P_r(t)=[X_r(t), Y_r(t), Z_r(t)]^T$ when the robot arrives a the target position;

calculating $\dot{P}_u = C_b^u V_u$, $\dot{V}_u = C_b^u A_b - G$, $\dot{\Phi} = \omega_{bx} + (\omega_{by}\sin\Phi + \omega_{bz}\cos\Phi)\tan\Theta$, $$\dot{\theta} = \omega_{by}\cos\Phi - \omega_{bz}\sin\Phi, \dot{\Psi} = \frac{\omega_{by}\sin\Phi + \omega_{bz}\cos\Phi}{\cos\Phi}; \text{ and}$$

calculating $X_r(t), Y_r(t)$, and $D(t)$ by calculating $C_b^u$ and $P_u(t)$, wherein D(t) denotes the distance between the remote controller and a top surface of the robot measured when the robot arrives at the target position, $Z_r$ denotes a height of the robot, $A_b=[A_{bx} A_{by} A_{bz}]^T$ denotes a measurement output from the three-axis accelerometer, $(\Phi,\Theta,\Psi)$ denotes the roll, pitch, and yaw angles, respectively, which are known as the Euler angles, each of $\omega_{bx}, \omega_{by}$, and $\omega_{bz}$ denotes a measurement output from a three-axis gyroscope of the remote controller, and $G=[0098]^T$ denotes the acceleration of gravity.

16. The method of claim 1, wherein, when calculating a new position of the robot in the inertial navigation frame of the robot, the position $[P_r(t)]_R$ of the robot is given by $[P_r(t)]_R=[0]_R+C_U^R[P_r(t)]_U$, where $[0]_R$ denotes the origin of the inertial navigation frame of the remote controller in the inertial navigation frame of the robot and $C_U^R$ denotes the direction cosine matrix specifying the relationship between the inertial navigation frame of the remote controller and the inertial navigation frame of the robot.

17. The method of claim 1, further comprising moving the robot in response to the calculated position information.

18. A robot control system comprising:
a remote controller operable by a user; and
a robot movable in accordance with a movement of the remote controller,
wherein the remote controller comprises:
a sensor to provide measurements necessary for calculating orientation and position information of the remote controller;
an orientation calculator to calculate an orientation of the remote controller based on the measurements provided by the sensor;
a position calculator to calculate a position of the remote controller based on the measurements provided by the sensor;
a target position calculator to calculate a target position indicated by the remote controller based on the orientation and position information calculated by the orientation calculator and the position calculator;
a coordinate converter to convert the target position calculated by the target position calculator in an inertial navigation frame of the remote controller into a target position shown in an inertial navigation frame of the robot;
a command generator to command the robot to move to the converted target position; and
a distance sensor to measure a distance between the remote controller and the robot, and
wherein the robot comprises:
a navigation controller to drive a navigation motor in response to a command from the command generator; and
a sensor to exchange signals with the distance sensor to measure the distance between the remote controller and the robot.

19. The robot control system of claim 18, wherein the sensor of the remote controller comprises an accelerometer, a gyroscope, a magnetic sensor, or a combination thereof.

20. The robot control system of claim 18, wherein the distance sensor comprises:
an infrared receiver/transmitter to transmit a first infrared signal to the sensor of the robot and to receive a second infrared signal transmitted from the sensor of the robot; and
an ultrasonic wave receiver/transmitter to transmit an ultrasonic signal to the robot and to receive the ultrasonic signal reflected by the robot.

21. The robot control system of claim 20, wherein the distance sensor further comprises a memory to store timing T1 when the ultrasonic wave receiver/transmitter transmits the ultrasonic signal and timing T2 when the ultrasonic wave receiver/transmitter receives the ultrasonic signal.

22. The robot control system of claim 18, wherein the sensor of the robot comprises an infrared receiver/transmitter to receive a first infrared signal transmitted from the distance sensor and to transmit a second infrared signal to the distance sensor.

23. The robot control system of claim 18, wherein:
the target position calculator calculates an initial position of the remote controller by $P_u(0)=[0, 0, Z_u(0)]^T$, when a position coordinate of the remote controller is $P_u(t)=[X_u(t), Y_u(t), Z_u(t)]^T$;
the target position calculator calculates an initial position of the robot by $P_r(0)=[X_r(0), Y_r(0), Z_r]^T$ when a position coordinate of the robot is $P_r(t)=[X_r(t), Y_r(t), Z_r(t)]^T$; and
an initial positional relationship between the remote controller and the robot is given by $C_b^u i_{bz} D(0)=P_r(0)-P_u(0)=[X_r(0), Y_r(0), Z_r-Z_u(0)]^T$, where $Z_r$ denotes a height of the robot, $I_{bz}=[0\ 0\ 1]^T$ is a unit vector in a Z-axis direction of a body frame of the remote controller, $D(0)$ denotes the initial distance between the remote controller and the robot, and $C_b^u$ denotes a direction cosine matrix.

24. The robot control system of claim 23, wherein the direction cosine matrix $C_b^u$ is given by $$C_b^n = \begin{bmatrix} \theta_c \Psi_c & -\Phi_c \Psi_s + \Phi_s \theta_s \Psi_c & \Phi_s \Psi_s + \Phi_c \theta_s \Psi_c \\ \theta_c \Psi_s & \Phi_c \Psi_s + \Phi_s \theta_s \Psi_s & -\Phi_s \Psi_c + \Phi_c \theta_s \Psi_s \\ -\theta_s & \Phi_s \theta_c & \Phi_c \theta_c \end{bmatrix},$$

where a subscript c represents a cosine function, a subscript s represents a sine function, and $(\Phi,\theta,\Psi)$ denotes roll, pitch, and yaw angles, respectively.

25. The robot control system of claim 24, wherein the roll angle $\Phi$ and the pitch angle $\theta$ are given by $$\begin{bmatrix} \Phi \\ \theta \end{bmatrix} = \begin{bmatrix} \arctan 2(-A_{by}, -A_{bz}) \\ \arctan 2(A_{bx}, \sqrt{(A_{by}^2 + A_{bz}^2)}) \end{bmatrix},$$

where $A_{bx}, A_{by}$ and $A_{bz}$ denote acceleration measurements on $X_b, Y_b$, and $Z_b$ axes of the body frame of the remote controller, respectively, obtained from a three-axis accelerometer included in the remote controller.

26. The robot control system of claim 24, wherein the yaw angle $\Psi$ is given by $$\Psi = \tan^{-1}\left(\frac{-M_{uy}}{M_{ux}}\right),$$

where $M_{ux}$, $M_{uy}$ and $M_{uz}$ denote magnetic measurements shown in the inertial navigation frame of the remote controller and are given by $$\begin{bmatrix} M_{ux} \\ M_{uy} \\ M_{uz} \end{bmatrix} = \begin{bmatrix} \cos\theta & \sin\theta\sin\Phi & \sin\theta\cos\Phi \\ 0 & \cos\Phi & -\sin\Phi \\ -\sin\theta & \cos\theta\sin\Phi & \cos\theta\cos\Phi \end{bmatrix} \begin{bmatrix} M_{bx} \\ M_{by} \\ M_{bz} \end{bmatrix},$$

where $M_{bx}$, $M_{by}$ and $M_{bz}$ denote magnetic measurements on the $X_b$, $Y_b$, and $Z_b$ axes of the body frame of the remote controller, respectively, obtained from a three-axis magnetic sensor included in the remote controller.

27. The robot control system of claim 18, wherein
a position coordinate of the remote controller in the inertial navigation frame of the remote controller is $P_u(t)=[X_u(t), Y_u(t), Z_u(t)]^T$, when the remote controller points at the target position, a position coordinate of the robot in the inertial navigation frame of the remote controller is $P_r(t)=[X_r(t),Y_r(t),Z_r(t)]^T$ when the robot arrives at the target position, and the target position calculator calculates the positional relationship between a starting position at which the robot is located and a target position to which the robot should move by $C_b^u(t)i_{bz}D(t)=P_r)t)-P_{u(t)=[xr}(t)-x_u(t),y_r(t)-y_u(t),z_r-z_u(t)]^T$ and by $\dot{P}_u=C_b^u V_u$, $\dot{V}_u=C_b^u A_b-G$, $\Phi=\omega_{bx}+(\omega_{by}\sin\Phi+\omega_{bz}\cos\Phi)\tan\theta$, $\theta=\omega_{by}\cos\Phi-\omega_{bz}\sin\Phi$, and $$\psi = \frac{\omega_{by}\sin\Phi + \omega_{bz}\cos\Phi}{\cos\Phi},$$

where D(t) denotes the distance between the remote controller and a top surface of the robot measured when the robot arrives at the target position, $Z_r$ denotes a height of the robot according to its size, $A_b=[A_{bx}A_{by}A_{bz}]^T$ denotes a measurement output from the three-axis accelerometer, $(\Phi,\theta,\Psi)$ denotes the roll, pitch, and yaw angles, respectively, each of $\omega_{bx}$, $\omega_{by}$, and $\omega_{bz}$ denotes a measurement output from a three-axis gyroscope of the remote controller, and $G=[0098]^T$ denotes the acceleration of gravity.

28. The robot control system of claim 18, wherein the coordinate converter calculates a direction cosine matrix $C_U^R$ specifying a relationship between the inertial navigation frame of the remote controller and the inertia navigation frame of the robot by calculating a difference between an absolute yaw angle of the navigation frame of the remote controller and an absolute yaw angle of the navigation frame of the robot, and an origin $[0]_R$ of the inertial navigation frame of the remote controller in the navigation frame of the robot is given by $[0]_R=[P_r(0)]_R-C_U^R[P_r(0)]_U$, where $[P_r(0)]_U$ denotes the initial position of the robot in the inertial navigation frame of the remote controller, $[P_r(t)]_R$ denotes the initial position of the robot in the inertial navigation frame of the remote controller, and the position $[P_r(t)]_R$ of the robot in the inertial navigation frame of the robot is given by $[P_r(t)]_R=[0]_R=C_U^R[P_r(t)]_U$.

* * * * *